US012724635B2

(12) United States Patent
Ding et al.

(10) Patent No.: US 12,724,635 B2
(45) Date of Patent: Sep. 1, 2026

(54) METHOD AND DEVICE FOR IDENTIFYING ANDROID SYSTEM DRAWING THREAD, AND MOBILE TERMINAL AND STORAGE MEDIUM

(71) Applicant: HUIZHOU TCL MOBILE COMMUNICATION CO., LTD., Huizhou (CN)

(72) Inventors: Tang Ding, Huizhou (CN); Binhong Wang, Huizhou (CN)

(73) Assignee: HUIZHOU TCL MOBILE COMMUNICATION CO., LTD., Huzhou (CN)

( * ) Notice: Subject to any disclaimer, the term of this patent is extended or adjusted under 35 U.S.C. 154(b) by 404 days.

(21) Appl. No.: 18/548,904

(22) PCT Filed: Jan. 18, 2022

(86) PCT No.: PCT/CN2022/072611
§ 371 (c)(1),
(2) Date: Sep. 3, 2023

(87) PCT Pub. No.: WO2022/183856
PCT Pub. Date: Sep. 9, 2022

(65) Prior Publication Data

US 2024/0143395 A1 May 2, 2024

(30) Foreign Application Priority Data

Mar. 3, 2021 (CN) ........................ 202110239090.X

(51) Int. Cl.
*G06F 9/46* (2006.01)
*G06F 9/48* (2006.01)
*G06F 9/54* (2006.01)

(52) U.S. Cl.
CPC ............ *G06F 9/4881* (2013.01); *G06F 9/544* (2013.01)

(58) Field of Classification Search
CPC ............................... G06F 9/4881; G06F 9/544
See application file for complete search history.

(56) References Cited

U.S. PATENT DOCUMENTS

2011/0050712 A1 3/2011 Jackson

FOREIGN PATENT DOCUMENTS

CN 108509260 A 9/2018
CN 110489228 A 11/2019

(Continued)

OTHER PUBLICATIONS

International Search Report in International application No. PCT/CN2022/072611,mailed on Apr. 13, 2022.

(Continued)

*Primary Examiner* — Gregory A Kessler
(74) *Attorney, Agent, or Firm* — PV IP PC; Wei Te Chung

(57) ABSTRACT

A method for identifying an Android system drawing thread, for a client based on an Android operating system, including following operations: creating a plurality of threads, wherein the threads include one or more of a main thread of an application process, a hardware rendering thread of an Android system, and a customized thread; performing cross-process communication through the threads, applying for a graphics buffer area, and calling a QueueBuffer function of BufferQueue to submit a graphic content drawn by the client to a system graphics buffer area; identifying a thread task according to a state of a process state switching, identifying a current running thread, marking a current task_struct of the thread as ui_thread, and obtaining a drawing thread state; and identifying the thread task according to the state of the (Continued)

S01 Creating a plurality of threads, wherein the threads comprise one or more of a main thread of an application process, a hardware rendering thread of an Android system, and a customized thread S02 Performing cross-process communication through the threads, applying for a graphics buffer area, and calling a QueueBuffer function of BufferQueue to submit a graphic content drawn by the client to a system graphics buffer area S03 Identifying a thread task according to a state of a process state switching, identifying a current running thread, marking a current task_struct of the thread as ui_thread, and obtaining a drawing thread state S04 Identifying the thread task according to the state of the process state switching, if the thread is not the current running thread, resetting the drawing thread state S05 The current running process calling a server and a drawing application, in the drawing application, SurfaceFlinger being used to control synthesis and drawing of a window process state switching, if the thread is not the current running thread, resetting the drawing thread state.

13 Claims, 3 Drawing Sheets

(56) References Cited

FOREIGN PATENT DOCUMENTS

| | | |
|---|---|---|
| CN | 111367741 A | 7/2020 |
| CN | 111831462 A | 10/2020 |
| CN | 113051047 A | 6/2021 |

OTHER PUBLICATIONS

Written Opinion of the International Search Authority in International application No. PCT/CN2022/072611,mailed on Apr. 13, 2022.

Chinese Office Action issued in corresponding Chinese Patent Application No. 202110239090.X dated Jul. 28, 2022, pp. 1-7.

European Search Report in European application No. 22762325.3, mailed on Feb. 26, 2025.

NPL1: Yuan Yujie mjackstudio@gmail com et al: "RunDroid: recovering execution call graphs for Android applications", pp. 949-953 , XP058698279, Aug. 21, 2017.

NPL2: Balsini Alessio:"Scheduling for the Android display pipeline", Jan. 16, 2020, pp. 1-9, XP055952043, Aug. 16, 2022.

METHOD AND DEVICE FOR IDENTIFYING ANDROID SYSTEM DRAWING THREAD, AND MOBILE TERMINAL AND STORAGE MEDIUM

CROSS REFERENCE TO RELATED APPLICATIONS

This application is a US national phase application based upon an International Application No. PCT/CN2022/072611, filed on Jan. 18, 2022, which claims the priority of the Chinese patent application submitted to the China Patent Office on Mar. 3, 2021, with the application No. 202110239090.X and the application title "METHOD AND DEVICE FOR IDENTIFYING ANDROID SYSTEM DRAWING THREAD, AND MOBILE TERMINAL AND STORAGE MEDIUM". The entire contents of the above application are incorporated herein by reference.

TECHNICAL FIELD

The present application relates to the technical field of Android operating system terminals, in particular to a method and a device for identifying Android system drawing thread, a mobile terminal, and a storage medium.

BACKGROUND

With the continuous development of computer technology, more and more software is installed on mobile terminals such as mobile phones, tablets, and desktop computers. Furthermore, software competes more and more fiercely for resources on the mobile terminal, such as central processing unit CPU, storage memory, IO and so on. Processor manufacturers are limited by power consumption and temperature, and in order to maintain the continuous growth of high-performance computing, computer technology has been developing towards multi-core computer architecture. In order to take full advantage of the multi-core architecture, the application is split into multiple threads that can run independently on a single CPU. In this way, the design program can be executed in parallel to improve the overall operating efficiency.

A thread is the smallest unit of program execution flow, an entity in a process, and the basic unit independently scheduled and dispatched by the system. Threads include three basic states: ready, stuck (blocked), and running. The ready state means that the thread has all the conditions to run, can run logically, and is waiting for the processor. The running state means that the thread owns the processor and is running. The stuck state means that the thread is waiting for an event (such as a semaphore), which is logically unexecutable. The stuck state of the thread may directly affect the running effect of the entire program. Therefore, how to identify drawing-related threads on the mobile terminal and maximize resource utilization has become a technical problem that needs to be solved.

SUMMARY OF INVENTION

Technical Problem

At present, when the software is running on the mobile terminal, there may still be multiple auxiliary processes left by the software, processes for collecting data to formulate user policies, processes for popping up pop-up windows, etc. on the mobile terminal. Since these residual processes occupy the resources of the mobile terminal, the mobile terminal often freezes or runs slowly.

Therefore, it is necessary to provide a method for identifying Android system drawing thread, a mobile terminal and a storage medium to solve the above problems.

Technical Solution

Problem Solution

This application provides a method and a device for identifying Android system drawing thread, a mobile terminal, and a storage medium, and the technical problems aimed at solving are: When the software is running on the mobile terminal, there may still be multiple software residual auxiliary processes, the process used to collect data to develop user policies, and the process used to pop up pop-up windows, etc. The residual process occupies the resources of the mobile terminal, causing the mobile terminal to freeze or run slowly. The stuck state of the thread may directly affect the running effect of the entire program.

In order to achieve the above object, the technical solution adopted by the application to solve the technical problems is as follows:

In a first aspect, the application provides a method for identifying an Android system drawing thread, for a client based on an Android operating system, comprising:

creating a plurality of threads, wherein the threads comprise one or more of a main thread of an application process, a hardware rendering thread of an Android system, and a customized thread;

performing cross-process communication through the threads, applying for a graphics buffer area, and calling a QueueBuffer function of BufferQueue to submit a graphic content drawn by the client to a system graphics buffer area;

identifying a thread task according to a state of a process state switching, identifying a current running thread, marking a current task_struct of the thread as ui_thread, and obtaining a drawing thread state; and identifying the thread task according to the state of the process state switching, if the thread is not the current running thread, resetting the drawing thread state.

In the above technical solution, preferably, identifying the thread task according to the state of the process state switching comprises:

when the current running thread is the main thread, setting the drawing thread state by whether the current running thread is in a foreground state, if the current running thread is in the foreground state, marking the current running thread as a drawing thread and entering a drawing process, or otherwise resetting the drawing thread state or entering a process with a default priority;

when the current running thread is the hardware rendering thread, setting a drawing state for the drawing thread when the drawing thread is initialized, and setting the drawing thread to a thread table maintained by a kernel, when the drawing thread is identified as setting a drawing flag, entering the drawing process, or otherwise entering the process with the default priority;

when the current running thread is a customized thread, identifying the current running thread in a drawing interface queueBuffer and setting the state of the drawing thread, when the client fills graphics buffer through the drawing interface, marking a caller as the drawing thread, when the current running thread is identified as setting the drawing flag, entering the drawing process, or otherwise entering the process with the default priority.

In the above technical solution, preferably, identifying the thread task according to the state of the process state switching comprises: wherein when the current running thread is the main thread, the main thread is identified by updating the process state, and then determining whether the main thread is the foreground state to set the state of the drawing thread.

In the above technical solution, preferably, in the operation of performing cross-process communication through the threads and applying for the graphics buffer area: the graphics buffer area is GraphicBuffer.

In the above technical solution, preferably, the operations of the method for identifying the Android system drawing thread further comprise: the current running thread sending a drawing request, calling an interface control ioctl function, and the ioctl function parsing the drawing request.

In the above technical solution, preferably, the operations of the method for identifying the Android system drawing thread further comprise: the current running process calling a server and a drawing application, in the drawing application, SurfaceFlinger being used to control synthesis and drawing of a window.

In the above technical solution, preferably, the operation of in the drawing application, SurfaceFlinger being used to control synthesis and drawing of the window, the SurfaceFlinger is connected with HWComposer, and the composed framebuffer area is sent to HWComposer as a target buffer area.

In a second aspect, the application provides a device for identifying an Android system drawing thread, comprising:

a thread creator configured to create a plurality of threads, wherein the threads comprise one or more of a main thread of an application process, a hardware rendering thread of an Android system, and a customized thread;

a buffer acquisitor configured to perform cross-process communication through the threads, apply for a graphics buffer area, and call a QueueBuffer function of BufferQueue to submit a graphic content drawn by the client to a system graphics buffer area;

a thread renderer configured to identify a thread task according to a state of a process state switching, identify a current running thread, mark a current task_struct of the thread as ui_thread, and obtain a drawing thread state; and a thread drawing controller configured to identify the thread task according to the state of the process state switching, if the thread is not the current running thread, reset the drawing thread state.

In a third aspect, the application provides a mobile terminal comprising a memory, a processor, and a program for identifying an Android system drawing thread stored on the memory and executable on the processor, wherein when the processor executes the program for identifying the Android system drawing thread, the processor executes the above method.

In a fourth aspect, the application provides a storage medium, wherein the storage medium stores a computer program for electronic data exchange, wherein the computer program causes a computer to execute the above method.

Beneficial Effect of Invention

Beneficial Effect

The method for identifying an Android system drawing thread provided by the present application identifies thread tasks according to the state when the process state is switched and identify the current running thread. In particular, the main thread, hardware rendering thread, and customized thread are marked differently. Specifically, identify whether the main thread is in the foreground state and then determine whether to enter the drawing process, identify whether the hardware rendering state is to set the drawing state during initialization to determine whether to enter the drawing process, and identify whether the customized thread sets the drawing state in the drawing interface queueBuffer to determine whether to enter the drawing process. This method helps to identify the state of each thread and identifies the state of each task. This enables no matter which thread performs cross-process communication to apply for GraphicBuffer, it can identify the state of each task identified. This enables the identified tasks to be given more resource avoidance during subsequent processing. This can further identify drawing-related processes on the mobile terminal and give maximum resource utilization, which can improve the utilization rate of the mobile system.

BRIEF DESCRIPTION OF DRAWINGS

Description of Drawings

The technical solutions and beneficial effects of the present application may be apparent through the detailed description of the specific embodiments of the present application below in conjunction with the accompanying drawings.

Figure 1:
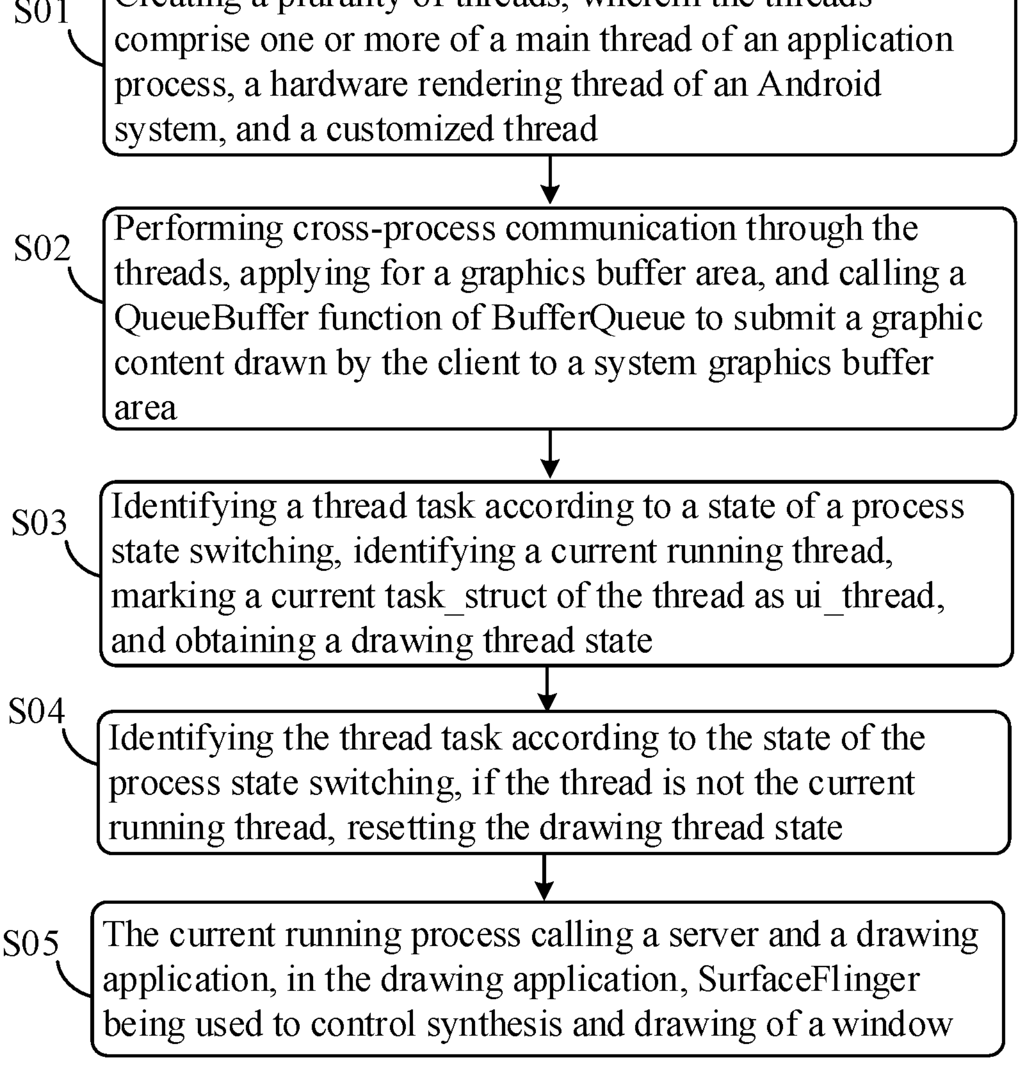

FIG. 1 is a flowchart of operations of a method for identifying an Android system drawing thread provided by the present application.

Figure 2:
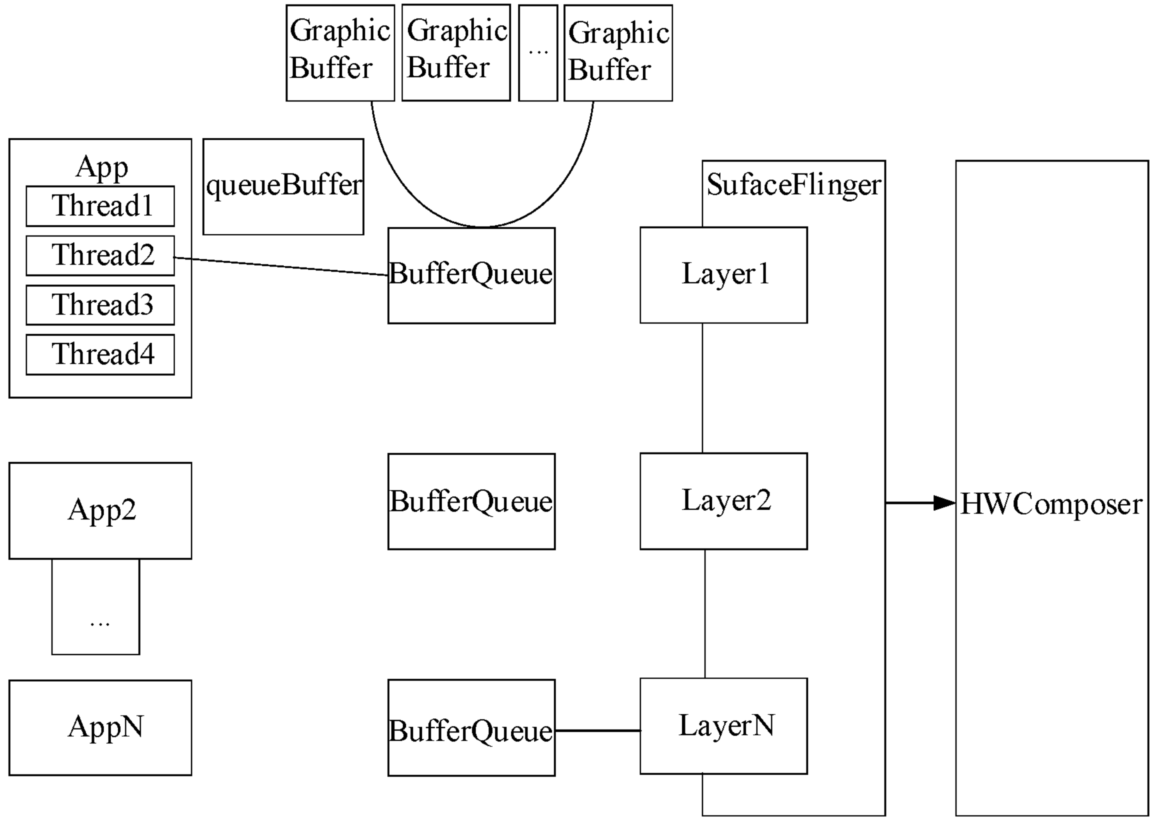

FIG. 2 is a frame diagram of drawing thread data flow provided by the present application.

Figure 3:
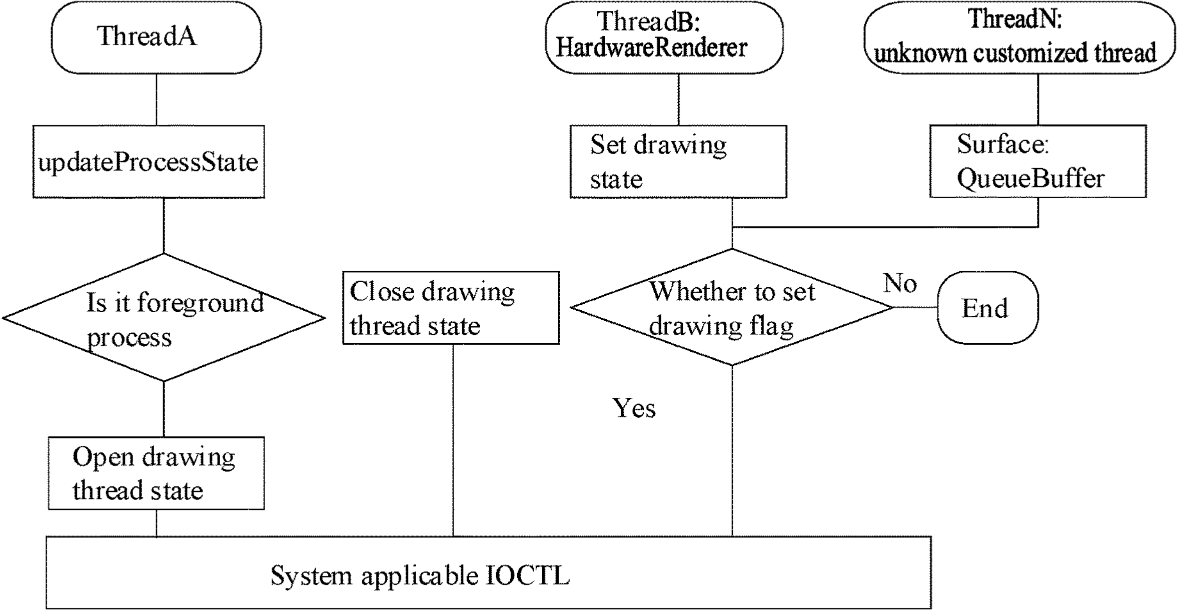

FIG. 3 is a specific flowchart of drawing thread identification provided by the present application.

Figure 4:
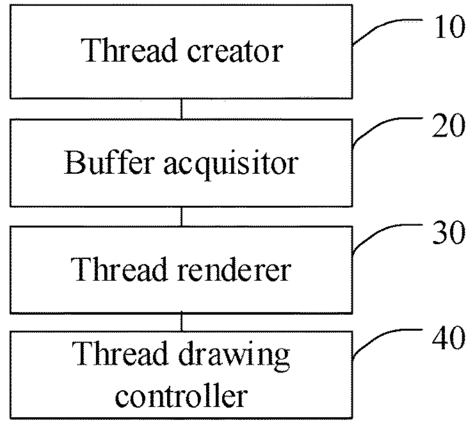

FIG. 4 is a functional block diagram of a device for identifying an Android system drawing thread provided by the present application.

The realization, functional features, and advantages of the present application will be further described in conjunction with the embodiments and with reference to the accompanying drawings.

DETAILED DESCRIPTION OF EMBODIMENTS

Embodiments of Invention

The realization, functional features, and advantages of the present application will be further described in conjunction with the embodiments and with reference to the accompanying drawings.

It should be understood that the specific embodiments described here are only used to explain the present application and are not intended to limit the present application.

Those skilled in the art will understand that unless otherwise stated, the singular forms “a”, “an”, “said” and “the” used herein may also include plural forms. It should be further understood that the word “comprising” used in the description of the present application refers to the presence of the features, integers, steps, operations, elements, and/or components, But it does not exclude the presence or addition of one or more other features, integers, steps, operations, elements, components, and/or groups thereof. It will be understood that when an element is referred to as being “connected” or “coupled” to another element, it can be directly connected or coupled to the other element or intervening elements may also be present. Additionally, "connected" or "coupled" as used herein may include wireless connection or wireless coupling. The expression "and/or" used herein includes all or any elements and all combinations of one or more associated listed items.

Those skilled in the art will understand that, unless otherwise defined, all terms (including technical terms and scientific terms) used herein have the same meaning as commonly understood by one of ordinary skill in the art to which this application belongs. It should also be understood that terms such as those defined in commonly used dictionaries should be understood to have a meaning consistent with the meaning in the context of the prior art, and unless specifically defined as here, it is not interpreted in an idealized or overly formal sense.

The methods discussed below, some of which are illustrated by flowcharts, can be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. The processor (s) can perform the necessary tasks.

Specific structural and functional details disclosed herein are representative only and are for purposes of describing example embodiments of the present application. This application may, however, be embodied in many alternative forms and should not be construed as limited to only the embodiments set forth herein.

Before discussing the exemplary embodiments in more detail, it should be mentioned that some exemplary embodiments are described as processes or methods depicted as flowcharts. Although the flowcharts describe operations as sequential processing, many of the operations may be performed in parallel, concurrently, or simultaneously. In addition, the order of operations can be rearranged. The process may be terminated when its operations are complete but may also have additional steps not included in the figure. The processing may correspond to a method, function, procedure, subroutine, subroutine, or the like.

Referring to FIG. 1 to FIG. 3 at the same time, wherein FIG. 1 is a flowchart of operations of a method for identifying an Android system drawing thread provided by the present application, FIG. 2 is a frame diagram of drawing thread data flow provided by the present application, and FIG. 3 is a specific flowchart of drawing thread identification provided by the present application.

According to the flowchart of operations provided in FIG. 1, the present application provides a method for identifying an Android system drawing thread, for a client based on an Android operating system, comprising following operations:

- S01: creating a plurality of threads, wherein the threads comprise one or more of a main thread of an application process, a hardware rendering thread of an Android system, and a customized thread;
- S02: performing cross-process communication through the threads, applying for a graphics buffer area, and calling a QueueBuffer function of BufferQueue to submit a graphic content drawn by the client to a system graphics buffer area;
- S03: identifying a thread task according to a state of a process state switching, identifying a current running thread, marking a current task_struct of the thread as ui_thread, and obtaining a drawing thread state;
- S04: identifying the thread task according to the state of the process state switching, if the thread is not the current running thread, resetting the drawing thread state;
- S05: the current running process calling a server and a drawing application, in the drawing application, SurfaceFlinger being used to control synthesis and drawing of a window.

Specifically, the present application provides an embodiment to describe the above steps in detail.

The Android system provides a graphics drawing system, and the application program can be called through a certain interface and pass its own drawing instructions to SurfaceFlinger for drawing and display through the given interface, wherein the specific operations and principles of the method for identifying the drawing thread of the Android system provided by the application are as follows:

- S01: creating a plurality of threads, wherein the threads comprise one or more of a main thread of an application process, a hardware rendering thread of an Android system, and a customized thread.

A thread is the smallest unit of program execution flow, an entity in a process, and the basic unit independently scheduled and dispatched by the system. An Android program has only one process (Process) by default, and multiple threads (Thread) can be set under one process. A thread is an execution scenario in a process, and a process can start multiple threads. Threads include three basic states: ready, stuck (blocked) and running. The ready state means that the thread has all the conditions to run, can run logically, and is waiting for the processor. The running state means that the thread owns the processor and is running. The stuck state means that the thread is waiting for an event (such as a semaphore), which is logically unexecutable. The method provided in this application is to identify the running state of the thread.

Threads in Android are mainly divided into two categories: UIThread, the main thread, also known as UI thread. The other type is WorkerThread, which is a customized thread, or a worker thread. UIThread is the main thread of application execution and is where most of the application code runs. All application components, including activities, services, content providers, BroadCastReceivers, etc., are created in this thread. Any system calls to the application components are executed in this thread. After an Android process is running, jvm (Java virtual machine) automatically starts a thread, that is, the main thread. In principle, any legal operation can be performed in this thread. Accessing the network generally takes a long time, and accessing the network in the main thread will cause the program to freeze or even freeze. As long as it is a time-consuming operation, it should not be performed in the main thread. Therefore, if there are long-term operations in the application, new threads must be opened. Thus, a UIThread thread and one or more WorkerThreads can exist in the program at the same time. In addition, there is a hardware rendering thread HardwareRenderer in the Android system by default. HardwareRenderer is the entry point for the entire hardware accelerated drawing, and its implementation is a ThreadedRenderer object. ThreadedRenderer should be closely related to a Render thread, and ThreadedRenderer is created in the UI thread, and its main function is to communicate with the rendering thread.

- S02: performing cross-process communication through the threads, applying for a graphics buffer area, and calling a QueueBuffer function of BufferQueue to submit a graphic content drawn by the client to a system graphics buffer area.

Specifically, the graphics buffer area is GraphicBuffer. According to the drawing principle of the Android system graphics system, whether it is a system built-in application or a third-party application, it is necessary to apply for a graphics buffer area from BufferQueue to prepare for drawing the content of the application, apply for the corresponding GraphicBuffer from SurfaceFlinger in the display system of the local operating system based on the image data requested for display by the current application thread, and then, draw the image data requested by the current application process to the GraphicBuffer. The GraphicBuffer after drawing the image data is synthesized into the final image content through the SurfaceFlinger and displayed as current screen information.

In addition, whether it is software drawing or hardware acceleration, the allocation of drawing memory is similar, and it is necessary to request the SurfaceFlinger service to allocate a piece of memory. The difference is that hardware acceleration may directly allocate memory from the FrameBuffer hardware cache. The drawing of both is on the application side, and SurfaceFlinger needs to be notified to synthesize after the drawing is completed.

S03: identifying a thread task according to a state of a process state switching, identifying a current running thread, marking a current task_struct of the thread as ui_thread, and obtaining a drawing thread state.

When the current running thread is thread A (main thread), thread A first updates the process state (updateProcessState), and then sets the state of the drawing thread according to whether it is the foreground state. If it is determined that thread A is in the foreground state, mark the current task_struct of thread A as ui_thread, obtain the drawing thread state, and call the IOCTL function through the system. IOCTL is a function that manages the I/O channel of the device in the device driver. The so-called management of the I/O channel is to control some characteristics of the device, such as the transmission baud rate of the serial port, the speed of the motor, and so on. In this embodiment, the drawing request sent by the current running thread is analyzed.

When the current running thread is thread B (hardware rendering thread HardwareRender), the drawing state is set for thread B when it is initialized and set to the thread table maintained by the kernel. When it is recognized that the thread B is in the setting drawing state, the current task_struct of the thread is marked as ui_thread, the state of the drawing thread is obtained, and the IOCTL function is called by the system.

When the current running thread is thread N (unknown custom thread), identify it in the drawing interface QueueBuffer and set the state of the drawing thread. When a client performs graphics buffer filling through the drawing interface QueueBuffer, mark the current task_struct of the calling thread as ui_thread, and obtain the state of the drawing thread. When it is recognized that the thread N is in the setting drawing state, it enters the drawing process and calls the IOCTL function through the system.

S04: identifying the thread task according to the state of the process state switching, if the thread is not the current running thread, resetting the drawing thread state.

When the current running thread is thread A (main thread), thread A first updates the process state (updateProcessState), and then sets the state of the drawing thread according to whether it is the foreground state. If it is determined that thread A is not in the foreground state, then reset the state of the drawing thread, and call the IOCTL function through the system.

When the current running thread is thread B (hardware rendering thread HardwareRender), the drawing state is set for thread B when it is initialized, and set to the thread table maintained by the kernel. When it is recognized that the thread B is in an unset drawing state, it adopts a default priority to enter the process.

When the current running thread is thread N (unknown custom thread), identify it in the drawing interface QueueBuffer and set the state of the drawing thread. When it is recognized that the thread N is in an unset drawing state, a default priority is used to enter the process.

S05: the current running process calling a server and a drawing application, in the drawing application, SurfaceFlinger being used to control synthesis and drawing of a window. Preferably, the SurfaceFlinger is connected to the HWComposer, and the synthesized frame buffer is sent to the HWComposer as a target buffer area.

In order to facilitate the description of the data flow principle of the drawing thread in the Android system, according to the frame diagram of the drawing thread data flow provided in FIG. 2, we can know:

Each application App includes multiple threads (Thread), and the application App can create multiple sub-threads Thread, and it is uncertain which thread will perform the drawing task. When the child thread needs to execute the drawing task, it may apply for a graphics cache from BufferQueue to prepare the content of the drawing application, and finally pass it to BufferQueue through queueBuffer, and hand it over to SurfaceFlinger for drawing.

In Android, a window is described by a Surface. If multiple windows need to be displayed at the same time, multiple windows need to be combined. This needs to display the composition of the service Surfaceflinger control window in the system, combine multiple windows into one, and then send it to the LCD. Surfaceflinger adopts the concept of layer, namely Layer. SurfaceFlinger synthesis is based on the realization of Display HAL, merging multiple Layers. SurfaceFlinger is to synthesize the content in multiple Surfaces, and finally submit it to the back buffer area of the screen, wait for the arrival of the next vertical synchronization signal of the screen, and then display it on the screen.

There are multiple buffer areas inside the Surface, forming a BufferQueue. Graphics are transferred through Buffer as a carrier. Surface is a further encapsulation of Buffer. That is to say, there are multiple Buffers inside the Surface for use by the upper layer.

In the Android system, the graphics buffer area allocated in the system frame buffer area is used in the SurfaceFlinger service. The graphics buffer area allocated in memory can be used in the SurfaceFlinger service or in other applications. When other applications need to use the graphics cache, they will request the SurfaceFlinger service to allocate them. Therefore, for other applications, they only need to map the graphics buffer area returned by the SurfaceFlinger service to their own process address space for use.

SurfaceFlinger is the management core of the entire Android display system, controls the overlay of each window, and calls the GPU or 2D accelerator for synthesis. In the interface, first call the dequeueBuffer function of BufferQueue to obtain a frame buffer, then start the GPU to synthesize the contents of each window into this frame buffer, and then call the queueBuffer function of Buffer- Queue. BufferQueue may call the fbPost function of HWComposer, and hand over the synthesized frame buffer to HWComposer as the target buffer of the 2D accelerator. Finally, SurfaceFlinger calls the commit function of HWComposer, HWComposer calls the interface fb_post of framebuffer_device_t and sends the target buffer area to framebuffer_device_t for display on the screen.

Specifically, according to the specific flowchart of drawing thread identification provided in FIG. 3, further we can know:

Thread A represents the main program of the application. When each application is created, a main thread is created by default for life cycle management. Thread A first updates the process state (updateProcessState), and then sets the state of the drawing thread according to whether it is the foreground state. If it is determined that thread A is in the foreground state, mark the current task_struct of the thread as ui_thread, obtain the state of the drawing thread, and call the IOCTL function through the system. If it is determined that thread A is not in the foreground state, then reset the state of the drawing thread, and call the IOCTL function through the system.

Thread B is a hardware rendering thread HardwareRenderer that exists by default in the Android system. For thread B, set the drawing state during initialization, and set it to the thread table maintained by the kernel. When it is recognized that the thread B is in the setting drawing state, the current task_struct of the thread is marked as ui_thread, the state of the drawing thread is obtained, and the IOCTL function is called by the system. When it is recognized that the thread B is in an unset drawing state, it enters the process with a default priority.

Thread N is an undefined thread, which has no specific flag bit for identification. Therefore, in this application, the QueueBuffer formed by multiple buffer areas inside the Surface is used for identification. Specifically, when a client fills the graphics buffer area through the drawing interface QueueBuffer, mark the current task_struct of the caller thread as ui_thread to obtain the drawing thread status. Subsequent identification operations are consistent with thread B. When it is recognized that the thread N is in the setting drawing state, the current task_struct of the thread is marked as ui_thread, the state of the drawing thread is obtained, and the IOCTL function is called by the system. When it is recognized that the thread N is in the unset drawing state, it enters process B with a default priority.

In one embodiment, a mobile terminal is provided, including a processor and a memory, the memory stores a program, and the processor is configured to perform the following operations:

- creating a plurality of threads, wherein the threads comprise one or more of a main thread of an application process, a hardware rendering thread of an Android system, and a customized thread;
- performing cross-process communication through the threads, applying for a graphics buffer area, and calling a QueueBuffer function of BufferQueue to submit a graphic content drawn by the client to a system graphics buffer area;
- identifying a thread task according to a state of a process state switching, identifying a current running thread, marking a current task_struct of the thread as ui_thread, and obtaining a drawing thread state;
- identifying the thread task according to the state of the process state switching, if the thread is not the current running thread, resetting the drawing thread state;
- the current running process calling a server and a drawing application, in the drawing application, SurfaceFlinger being used to control synthesis and drawing of a window.

The processor of the mobile terminal is used to provide calculation and control capabilities. The memory of the mobile terminal includes a non-volatile storage medium and an internal memory. The non-volatile storage medium stores an operating system and computer programs. The internal memory provides an environment for the operation of the operating system and computer programs in the non-volatile storage medium. The network interface of the mobile terminal is used to communicate with external terminals through a network connection. When the computer program is executed by the processor, a method for identifying the drawing thread of the Android system is implemented.

In other implementations, as shown in FIG. 3, the embodiment of the present application further provides a device for identifying an Android system drawing thread, for a client based on an Android operating system, comprising:

- a thread creator 10 configured to create a plurality of threads, wherein the threads comprise one or more of a main thread of an application process, a hardware rendering thread of an Android system, and a customized thread;
- a buffer acquisitor 20 configured to perform cross-process communication through the threads, apply for a graphics buffer area, and call a QueueBuffer function of BufferQueue to submit a graphic content drawn by the client to a system graphics buffer area;
- a thread renderer 30 configured to identify a thread task according to a state of a process state switching, identify a current running thread, mark a current task_struct of the thread as ui_thread, and obtain a drawing thread state; and
- a thread drawing controller 40 configured to identify the thread task according to the state of the process state switching, if the thread is not the current running thread, reset the drawing thread state.

In another embodiment, the present application provides a storage medium, the storage medium stores a computer program for electronic data exchange, wherein the computer program causes a computer to execute the above-mentioned method.

Those of ordinary skill in the art can understand that all or part of the processes in the methods of the above embodiments can be implemented by instructing related hardware through computer programs. The computer program can be stored in a non-volatile computer-readable storage medium. When the computer program is executed, it may include the procedures of the embodiments of the above-mentioned methods. Any reference to memory, storage, database or other media used in the various embodiments provided herein may include non-volatile and/or volatile memory. Nonvolatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. By way of illustration and not limitation, RAM is available in many forms such as Static RAM (SRAM), Dynamic RAM (DRAM), Synchronous DRAM (SDRAM), Double Data Rate SDRAM (DDRSDRAM), Enhanced SDRAM (ESDRAM), Synchronous Chain Synchlink DRAM (SLDRAM), memory bus (Rambus) direct RAM (RDRAM), direct memory bus dynamic RAM (DRDRAM), and memory bus dynamic RAM (RDRAM), etc.

In summary, the method for identifying an Android system drawing thread provided by the present application identifies thread tasks according to the state when the process state is switched and identify the current running thread. In particular, the main thread, hardware rendering thread, and customized thread are marked differently. Specifically, identify whether the main thread is in the foreground state and then determine whether to enter the drawing process, identify whether the hardware rendering state is to set the drawing state during initialization to determine whether to enter the drawing process, and identify whether the customized thread sets the drawing state in the drawing interface queueBuffer to determine whether to enter the drawing process. This method helps to identify the state of each thread and identifies the state of each task. This enables no matter which thread performs cross-process communication to apply for GraphicBuffer, it can identify the state of each task identified. This enables the identified tasks to be given more resource avoidance during subsequent processing. This can further identify drawing-related processes on the mobile terminal and give maximum resource utilization, which can improve the utilization rate of the mobile system.

In addition, parts of the present application may be implemented as computer program products, such as computer program instructions. When it is executed by a computer, the method and/or technical solution according to the present application can be invoked or provided through the operation of the computer. The program instructions for invoking the method of the present application may be stored in a fixed or removable recording medium, and/or transmitted through a data stream in a broadcast or other signal-carrying medium, and/or stored in a in the working memory of the computer device on which the program instructions described above are executed. Here, an embodiment according to the present application comprises an apparatus comprising a memory for storing computer program instructions and a processor for executing the program instructions. When the computer program instructions are executed by the processor, the device is triggered to run the methods and/or technical solutions based on the aforementioned multiple embodiments of the present application.

Finally, it should be noted that it is obvious to a person skilled in the art that the present application is not limited to the details of the exemplary embodiments described above. Moreover, the present application can be implemented in other specific forms without departing from the spirit or essential characteristics of the present application. Therefore, the embodiments should be regarded as exemplary rather than restrictive in every respect. The scope of the application is defined by the appended claims rather than the above description, and all changes that come within the meaning and range of equivalency of the claims are intended to be embraced therein. Any reference sign in a claim should not be construed as limiting the claim concerned. In addition, it is obvious that the word "comprising" does not exclude other elements or steps, and the singular does not exclude the plural. A plurality of units or devices stated in the system claims may also be realized by one unit or device through software or hardware. The words first, second, etc. are used to denote names and do not imply any particular order. The application of the present application is not limited to the above examples, and it is still possible to modify the technical solutions described in the foregoing embodiments or perform equivalent replacements for some of the technical features. However, these modifications or replacements do not make the essence of the corresponding technical solutions deviate from the spirit and scope of the technical solutions of the embodiments of the present application.

What is claimed is:

1. A method for identifying an Android system drawing thread, for a client based on an Android operating system, comprising following operations:

- creating a plurality of threads, wherein the threads comprise one or more of a main thread of an application process, a hardware rendering thread of an Android system, and a customized thread;
- performing cross-process communication through the threads, applying for a graphics buffer area, and calling a QueueBuffer function of BufferQueue to submit a graphic content drawn by the client to a system graphics buffer area;
- identifying a thread task according to a state of a process state switching, identifying a current running thread, marking a current task_struct of the thread as ui_thread, and obtaining a drawing thread state; and
- identifying the thread task according to the state of the process state switching, if the thread is not the current running thread, resetting the drawing thread state.

2. The method for identifying the Android system drawing thread of claim 1, wherein identifying the thread task according to the state of the process state switching comprises:

- when the current running thread is the main thread, setting the drawing thread state by whether the current running thread is in a foreground state, if the current running thread is in the foreground state, marking the current running thread as a drawing thread and entering a drawing process, or otherwise resetting the drawing thread state or entering a process with a default priority;
- when the current running thread is the hardware rendering thread, setting a drawing state for the drawing thread when the drawing thread is initialized, and setting the drawing thread to a thread table maintained by a kernel, when the drawing thread is identified as setting a drawing flag, entering the drawing process, or otherwise entering the process with the default priority;
- when the current running thread is a customized thread, identifying the current running thread in a drawing interface queueBuffer and setting the state of the drawing thread, when the client fills graphics buffer through the drawing interface, marking a caller as the drawing thread, when the current running thread is identified as setting the drawing flag, entering the drawing process, or otherwise entering the process with the default priority.

3. The method for identifying the Android system drawing thread of claim 2, wherein identifying the thread task according to the state of the process state switching comprises:

- wherein when the current running thread is the main thread, the main thread is identified by updating the process state, and then determining whether the main thread is the foreground state to set the state of the drawing thread.

4. The method for identifying the Android system drawing thread of claim 1, wherein in the operation of performing cross-process communication through the threads and applying for the graphics buffer area:

- the graphics buffer area is GraphicBuffer.

5. The method for identifying the Android system drawing thread of claim 1, wherein the operations of the method for identifying the Android system drawing thread further comprise:

the current running thread sending a drawing request, calling an interface control ioctl function, and the ioctl function parsing the drawing request.

6. The method for identifying the Android system drawing thread of claim 1, wherein the operations of the method for identifying the Android system drawing thread further comprise:

the current running process calling a server and a drawing application, in the drawing application, SurfaceFlinger being used to control synthesis and drawing of a window.

7. The method for identifying the Android system drawing thread of claim 6, wherein the operation of in the drawing application, SurfaceFlinger being used to control synthesis and drawing of the window, the SurfaceFlinger is connected with HWComposer, and the composed framebuffer area is sent to HWComposer as a target buffer area.

8. A mobile terminal comprising a memory, a processor, and a program for identifying an Android system drawing thread stored on the memory and executable on the processor, wherein when the processor executes the program for identifying the Android system drawing thread, the processor executes:

creating a plurality of threads, wherein the threads comprise one or more of a main thread of an application process, a hardware rendering thread of an Android system, and a customized thread;

performing cross-process communication through the threads, applying for a graphics buffer area, and calling a QueueBuffer function of BufferQueue to submit a graphic content drawn by the client to a system graphics buffer area;

identifying a thread task according to a state of a process state switching, identifying a current running thread, marking a current task_struct of the thread as ui_thread, and obtaining a drawing thread state; and identifying the thread task according to the state of the process state switching, if the thread is not the current running thread, resetting the drawing thread state.

9. The mobile terminal of claim 8, wherein the processor is further configured to perform:

when the current running thread is the main thread, setting the drawing thread state by whether the current running thread is in a foreground state, if the current running thread is in the foreground state, marking the current running thread as a drawing thread and entering a drawing process, or otherwise resetting the drawing thread state or entering a process with a default priority;

when the current running thread is the hardware rendering thread, setting a drawing state for the drawing thread when the drawing thread is initialized, and setting the drawing thread to a thread table maintained by a kernel, when the drawing thread is identified as setting a drawing flag, entering the drawing process, or otherwise entering the process with the default priority;

when the current running thread is a customized thread, identifying the current running thread in a drawing interface queueBuffer and setting the state of the drawing thread, when the client fills graphics buffer through the drawing interface, marking a caller as the drawing thread, when the current running thread is identified as setting the drawing flag, entering the drawing process, or otherwise entering the process with the default priority.

10. The mobile terminal of claim 9, wherein the processor is further configured to perform:

wherein when the current running thread is the main thread, the main thread is identified by updating the process state, and then determining whether the main thread is the foreground state to set the state of the drawing thread.

11. The mobile terminal of claim 8, wherein the graphics buffer area is GraphicBuffer.

12. The mobile terminal of claim 8, wherein the processor is further configured to perform:

the current running thread sending a drawing request, calling an interface control ioctl function, and the ioctl function parsing the drawing request.

13. The mobile terminal of claim 8, wherein the processor is further configured to perform:

the current running process calling a server and a drawing application, in the drawing application, SurfaceFlinger being used to control synthesis and drawing of a window.

* * * * *